July 7, 1964 L. YISSAR 3,139,837
FLUID PISTON ENGINE AND METHOD OF OPERATING SAME
Filed Oct. 14, 1959 7 Sheets-Sheet 1
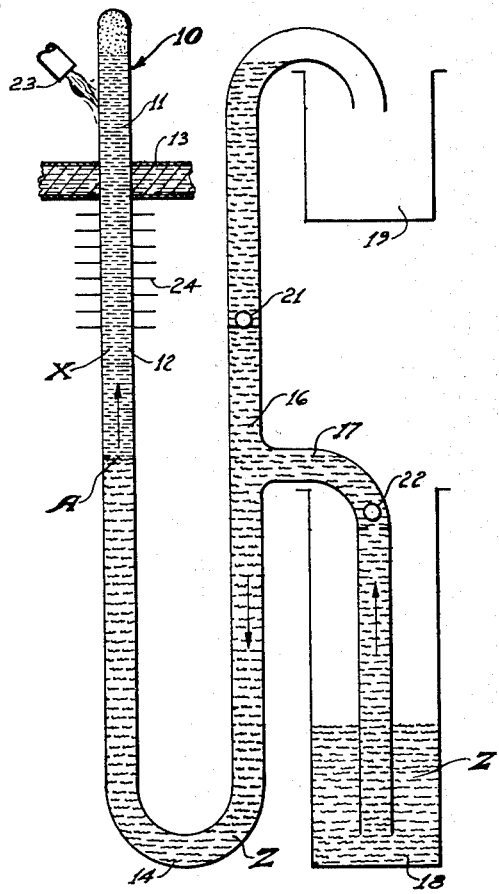
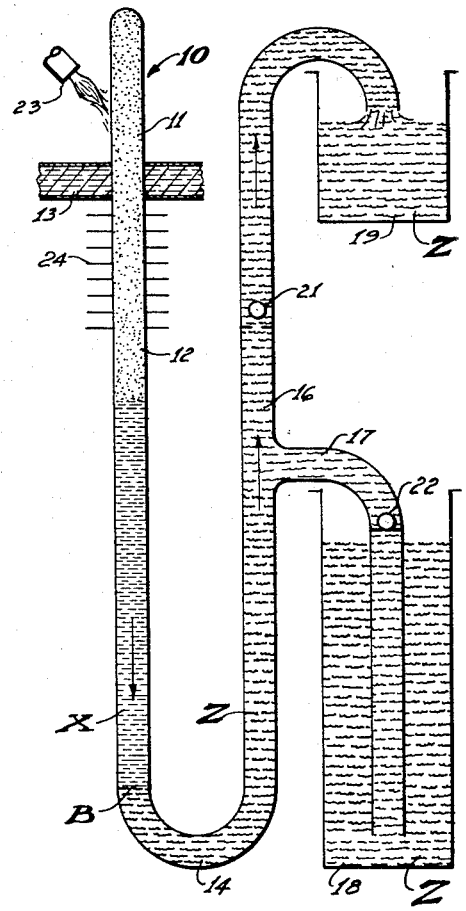
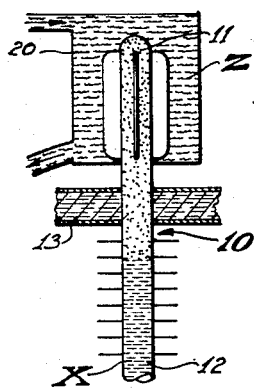
INVENTOR.
Levi Yissar
BY
John J. McLoughlin
Attorney July 7, 1964 L. YISSAR 3,139,837
FLUID PISTON ENGINE AND METHOD OF OPERATING SAME
Filed Oct. 14, 1959 7 Sheets-Sheet 2

INVENTOR.
Levi Yissar
BY
John J. McLaughlin
Attorney

INVENTOR.
Levi Yissar

July 7, 1964
L. YISSAR
3,139,837
FLUID PISTON ENGINE AND METHOD OF OPERATING SAME
Filed Oct. 14, 1959
7 Sheets-Sheet 4
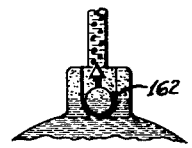
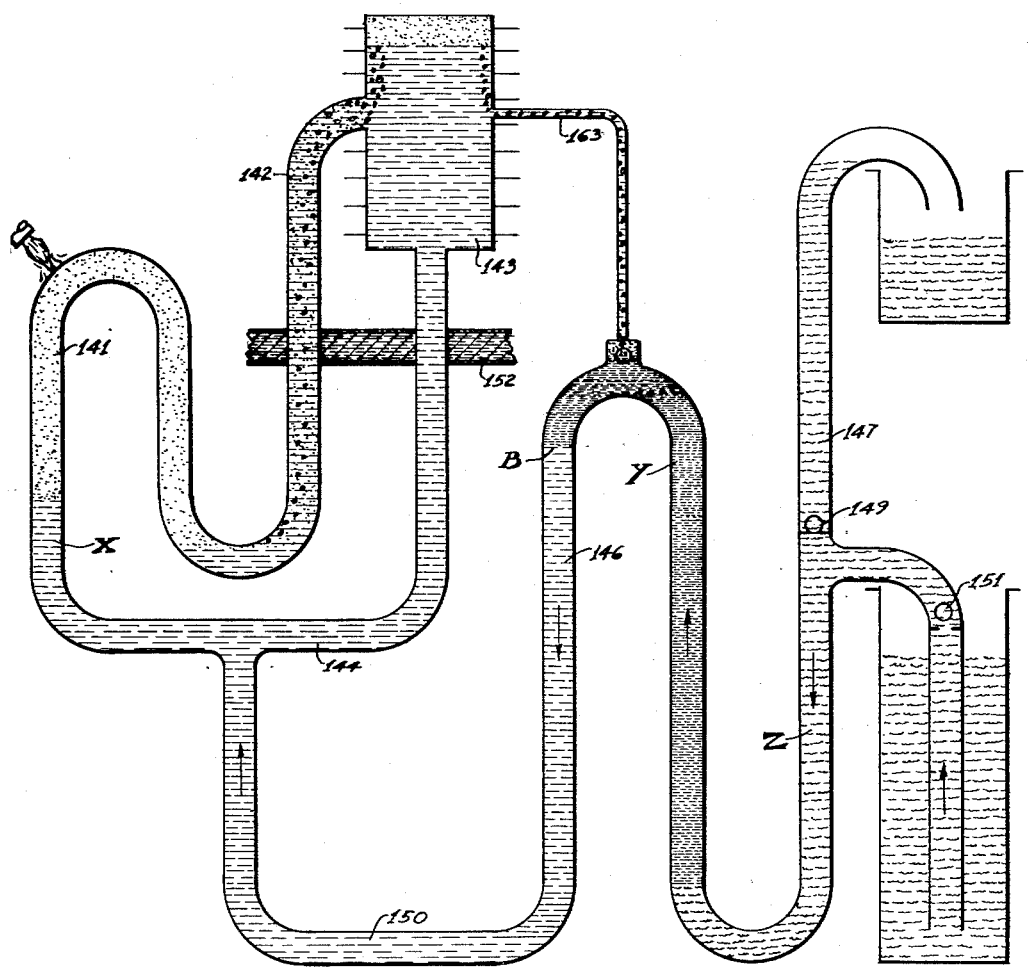
INVENTOR.
Levi Yissar
BY
John J. McLaughlin
Attorney INVENTOR.
Levi Yissar INVENTOR.
Levi Yissar United States Patent Office 3,139,837
Patented July 7, 1964

3,139,837
FLUID PISTON ENGINE AND METHOD OF
OPERATING SAME
Levi Yissar, 300 W. Alameda, Tucson, Ariz.
Filed Oct. 14, 1959, Ser. No. 846,451
1 Claim. (Cl. 103—255)

Since the invention of the water wheel and later the steam engine, there have been extensive developments of methods and means to harness sources of energy and do useful work. In general, all such developments reaching the useful commercial stage have harnessed readily convertible sources of stored energy such as water affording a hydrostatic head and fossil fuels such as coal, oil and gas. Most recently, of course, there has been extensive development looking toward the economic harnessing of nuclear power.

For about a hundred years there has been a continued development of power-generating means in which a liquid, frequently water, has been driven by a body of its own vapor directly without an intervening piston as in the steam engine, and in which the vapor is condensed to form a vacuum which in turn draws a supply of the liquid into the generator in which the vapor is formed, or generated vapor is displaced to a different area and produces a siphoning action with concomitant vapor condensation in such different area. Patent No. 47,051 issued to Thayer in 1865 is illustrative of an early form of this type of device which, for convenience of identification, may be called a thermally actuated fluid piston engine.

Fluid piston engines of the type identified have had several theoretical advantages which have caused engineers and scientists to continue their development. One advantage is that they can use sources of heat not ordinarily successfully utilized, such as exhaust heat as in Dienner Patent 1,745,568 and Scott-Snell et al. Patent 1,773,551, or solar heat as suggested by other investigators. Since the fluid piston has been driven by generated vapor of the same liquid and, in the case of water, the volume of steam to liquid is of the order of 2000 to one, and since, further, fluid piston engines can operate with no moving mechanical parts except, in some structures, simple check valves, relatively high efficiencies have been thought attainable. In general, however, absolute efficiencies of less than 5% represent the best efforts of prior art researchers.

The principal object of my invention is the provision of a vapor actuated prime mover of the general type identified which can utilize the desirable features of prior art devices but avoids many of their disadvantages.

Another object is to provide a new and improved method for operating a fluid piston engine.

Another object of my invention is to improve the efficiency of fluid piston engines of the type identified.

Still another object is to provide a fluid piston engine in which the working liquid operates in a closed cycle instead of in an open cycle characteristic of engines of the prior art.

A further object is to utilize a working liquid which is distinct from the pumped liquid, but in which the action on the pumped liquid is direct and effective.

A still further object is to produce a fluid piston engine of the character identified in which an intermediate liquid is effective between the working liquid and the pumped liquid.

Other specific objects and features of my invention will be apparent from the following detailed description taken with the accompanying drawings wherein:

FIG. 1 is a schematic view showing a simplified embodiment of features of my invention in which the generator may be of a simplified form such as might comprise a portion of a solar heat collector;

FIG. 2 is a view identical with FIG. 1 but showing the disposition of the working and pumped liquids during a pressure or working stroke;

FIG. 3 is a fragmentary view showing a structure in which the working liquid may be heated by the pumped liquid;

FIG. 9 illustrates a construction and arrangement in which the transmitting liquid is lighter than the pumped and working liquids;

FIG. 10 is an enlarged view of a portion of FIG. 9;

Figure 4:
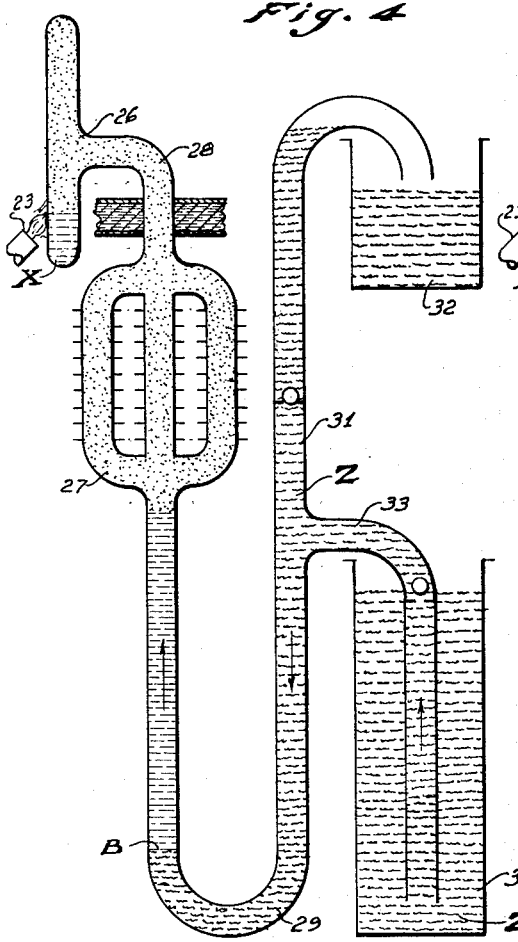
FIG. 4 is an embodiment similar to FIGS. 1 and 2 but showing means to avoid production of superheated vapor and providing enlarged condenser capacity.

In accordance with the main features of my invention, the working liquid which is alternately vaporized to produce a power stroke and condensed to produce a suction stroke is confined by another liquid in such a manner as to produce a closed cycle operation. This feature markedly differs from the common form of fluid piston engine in which the working liquid is identical with the pumped liquid, and in which the working vapor bubbles up through the pumped liquid when it condenses and simultaneously heats the pumped liquid. The liquid which confines the working liquid to a closed cycle may be the pumped liquid, or it may be an intervening liquid not readily miscible with either. The intermediate liquid may be heavier or lighter than the working and pumped liquids, and the design of the engine may be controlled to accommodate any selected or desired type of intermediate liquid. In order to utilize the maximum proportion of generated vapor power, the condenser is also preferably completely isolated from the vapor generator during the pressure stroke of the liquid piston.

In all the devices of the prior art with which I am familiar, the working vapor either passes through the condenser during the pumping or pressure stroke, or the vapor bubbles up through the pumped liquid and out of the system to be replaced, of course, by additional cold liquid drawn from the pumped liquid source. Loss of efficiency results from these prior art arrangements, however regardless of the specific action. This loss of efficiency is avoided to a maximum degree in my improved fluid piston engine.

Except for the improvements discussed hereinabove, the vapor actuated prime mover of my invention may use any of the advantageous features of the prior art where design requirements indicate their use. Thus, any of the usual high heat conductivity materials may be used in fabricating the generator, such as copper or brass as described in prior art Patents Nos. 47,051 or 1,694,911. In the actual pumping action, the intake portion of the system may be made larger than the outlet portion so that the refill or suction time stroke interval may be decreased markedly as contrasted with the pressure stroke. In this connection, also, a connecting tubing between the various parts of the engine may be graduated as to size as in Scott-Snell et al. Patent No. 1,848,226, for example, to utilize the advantages of such graduation when required by the design.

Referring now to a simplified form of the invention as shown in FIGS. 1 and 2, a tube 10 comprising a vapor generator portion 11 and condenser portion 12 separated by a heat insulator 13 is directly connected with one leg of a U-tube 14, the second leg of the U-tube 14 being also connected with a vertical tube 16. A side tube 17 projects from the vertical tube 16 and extends downwardly into a supply reservoir 18, and the upper end of tube 16 leads to a delivery tank 19. Check valves 21 and 22 are provided in the tubes 16 and 17, respectively. While the fluid piston engine shown in FIGS. 1 and 2 is schematically illustrated, the arrangement of parts is such as clearly to show the manner of its operation. The tube 10 is filled with working liquid to the point A in FIG. 1, the balance of the system being filled with the pumped liquid which in this arrangement should be heavier than and compatible with the working liquid. The liquids used depend on specific circumstances, design of the equipment, heat source, and other obvious considerations which will be discussed hereinbelow. By providing a closed cycle system there is immediately made available to the designer a large number of operating combinations to secure specific functional advantages. When reference is made to compatibility of the working and pumped liquids, I include the requirement that they be relatively mutually insoluble and immiscible under the conditions encountered at their interface. There are at times other required conditions of compatibility. For ease of identification, the working and pumped liquids are shaded differently and are identified by the letters X and Z, respectively.

The design shown in FIGS. 1 and 2 is illustrative of a simple arrangement wherein the tube 10 is relatively long and narrow, and wherein the heat source 23 may comprise direct sun rays concentrated and/or conducted by a suitable solar heat collector of which many structures are known. Substantially any source of heat 23 may be used, but characteristic of the best source in the intended manner of operation is that it not be intermittent. The tank 18, for example, may comprise a well or water reservoir, and tank 19 may suitably be an irrigation ditch. Under such circumstances, any suitable number of vapor actuated prime movers may be used to provide the total power required at an installation. In actual installation the generator 11, for example, would lie along a slanting roof with the condenser 12 in a cooler area not directly in line with the sun's rays, or intensified cooling can be employed as indicated by the cooling fins 24 on the condenser.

Assuming that the pumped fluid is water, the working fluid may be benzene, pentane, naphtha, certain naphthal benzene and naphthal derivatives lighter than water, and under controlled conditions some of the Freon type compounds ($CHCl_2F$ for example). For instance, because of the relatively high specific gravity of Freon, it should not be placed in a position where it will displace water by gravity. The working liquid also should preferably have a relatively low latent heat of vaporization and relatively high vapor pressure.

Illustratively, in the operation of the simple embodiment of FIGS. 1 and 2, the tube 10 having first been filled with relatively light weight working liquid to the point A and the balance of the system filled with water, the source of heat 23 is continuously applied to the generator and the working liquid is vaporized and expanded to drive the interface between the working and pumped liquids to a point B (FIG. 2). The level of the pumped liquid in the U-tube 14 is raised a distance generally equal to the vaporized portion of working liquid, or a distance generally equal to the distance between the points A and B. Since the displaced pumped liquid cannot be discharged through tube 17 because of the action of check valve 22, liquid equivalent to the volume of the expanded and vaporized working liquid is discharged through tube 16 into tank 19. As the expanded vapor fills the condenser 12 it is cooled to the dew point, a vacuum is created in tube 10, the working liquid is drawn into the generator 11, and water is drawn from tank 18 past check valve 22, check valve 21 now being closed to prevent return of pumped liquid from the vertical tube 16. While tube 10 is shown as straight, it may be formed in accordance with any of the usual structures of the prior art to retain a slight amount of liquid in the generator and so prevent any superheating of the vapor. Some loss of efficiency can result if the vapor in the generator should become superheated because of complete vaporization of all liquid in the generator area.

The specific manner in which the cycle of evaporization of the working liquid during the pressure stroke of the fluid piston engine of my invention and the manner in which condensation during the suction stroke occur will become more apparent in discussion of other embodiments. It should be understood, however, that my invention is conceived primarily with the control of a closed cycle operation of a distinct separate working liquid. Known structures of vapor generator condensers and connecting tubing may be used within the scope of the essential novelty of my invention.

In FIG. 3 I illustrate a modified heating means which may be employed with the FIG. 1 embodiment. The generator is finned to accelerate heat transfer and is surrounded by a vessel 20 which, for example, may continuously receive heated water from a solar heater, waste heat source or the like. A liquid, such as petroleum ether, which has a lower boiling point and higher vapor pressure than water can thus be used as a working liquid successfully even when the heated water is considerably below its own boiling point. In this form of the engine the liquid being pumped, under suitable conditions, may thus be used to heat the generator and supply its own latent energy to the operation.

Figure 5:
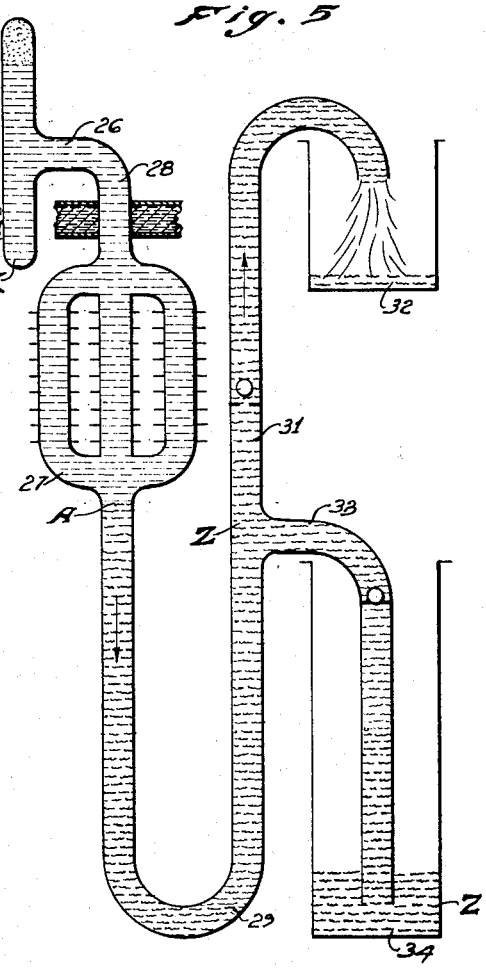
FIG. 5 is a view similar to FIG. 4 but showing a different point in the operating cycle.

FIGS. 4 and 5 show an embodiment in which the vapor generator 26 is connected to the condenser 27 at an intermediate point by a connecting tube 28, and the source of heat 23 is applied above the bottom tip of the generator so that some working liquid will always be trapped therein. The condenser 27 is suitably formed to provide an increased cooling surface resulting in more rapid condensation. Thus, on the working stroke, action may be controlled to be relatively slow and uniform but the suction stroke will be rapid. A U-tube 29 has one leg connected to the bottom of condenser 27 and the other leg connected to a vertical tube 31 running to a tank 32 and having a side tube 33 leading to a reservoir 34.

While in FIGS. 4 and 5 an intermediate liquid may be provided between the working liquid X and the pumped liquid Z, this embodiment is shown as employing only the two liquids. Features and advantages in the use of a different transmitting liquid will be pointed out more in detail by reference thereto (as reference character Y) in later described embodiments. As in the embodiments of FIGS. 1 and 2, the letter A is used to identify the uppermost position of the working liquid at the end of the suction stroke, during which time the movement of all liquids is in the direction indicated by the several arrows appearing inside the tubes. The letter B similarly identifies the lowermost position of the pumped liquid at the end of the pressure or working stroke. It will be noticed that the total displacement of pumped liquid in general is a function of the volume of vapor generated between the two extremes. Generally speaking, the particular functional value remains unchanged throughout repeated cycles of operation, but some reference to slight variations of this formula under conditions of actual operation will appear later.

Figure 6:
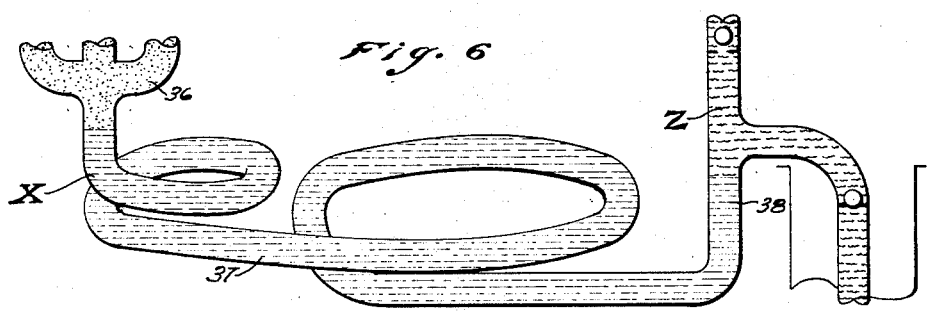
FIG. 6 shows a modification which permits reduction in overall size of the engine.

Since the volume of heat generated vapor is a measure of the liquid displacement in the tubes and, depending on the specific liquids and structures used, it is undesirable to permit a liquid to be permanently displaced as would occur if the interface between liquids was forced around a bend, the tubes normally must be made quite long, particularly the U-tube 29 in FIGS. 4 and 5. This problem is especially likely to occur if an intermediate or separate power-transmitting liquid is used. One method of shortening the legs of a U-tube is, of course, to increase its diameter to thus increase its volume. Sometimes a preferred method may be the construction indicated in FIG. 6 in which the bottom of a generator 36 is connected to a tube 37 having one or more coils, with the tube 37 then connected to an upright tube 38 which may be functionally equivalent to tube 31 in FIG. 4. Tube 37 may be flexible if desired. In the FIG. 6 form, three liquids may be used if desired. Thus ample volume in tube 37 may be attained without appreciable height.

Figure 7:
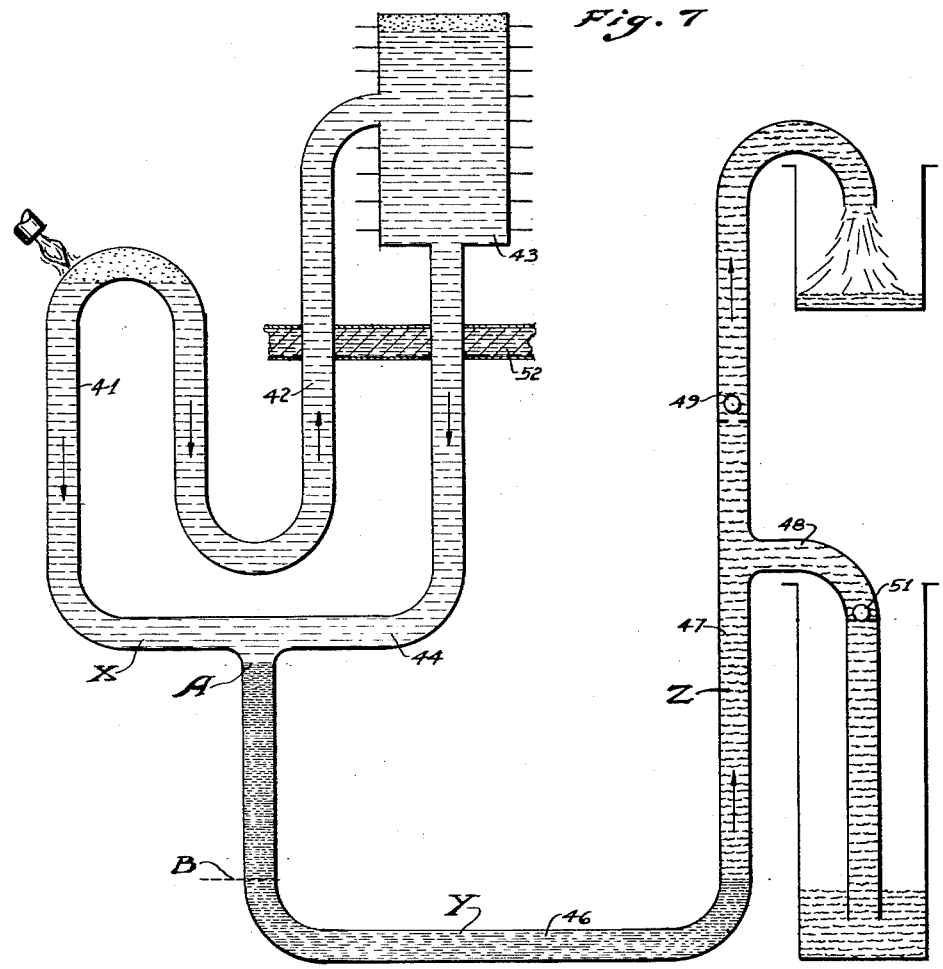
FIG. 7 is a schematic view of another form of the invention in which the generator comprises a common inverted U-type tube, and in which a relatively heavy liquid transmits power from the working liquid to the pumped liquid.

In FIG. 7 the generator (or evaporator, as it is sometimes called) is in the form of an inverted U-tube 41 with one leg connected by a tube 42 to an intermediate point of a condenser 43 placed above the generator. The opposite leg of the U-tube 41 is connected by a U-tube 44 to the bottom of condenser 43. A U-tube 46 containing a relatively heavy intermediate liquid has one leg (which may be called its hot leg) connected to the bottom of U-tube 44 and the opposite leg connected to an upright pumping tube 47 having a side tube 48. Check valves 49 and 51, respectively, are provided in tubes 47 and 48. Insulation 52 may be provided between the generator and condenser.

In operating the liquid piston engine comprising FIG. 7, assuming water is to be pumped, the generator and condenser are filled with a suitable relatively light liquid, the tube 46 with a relatively heavy transmitting liquid, and the tube 47 is filled, for example, with water. The letters A and B indicate limits of the working liquid, as in previous embodiments, although the drawing shows only the positions of the liquids at the beginning of the pressure stroke. The letters X, Y and Z also identify the three liquids, and as in previous embodiments the location of the interface is recognizable by the difference in the shading used. Suitably the intermediate liquid may be carbon disulfide, carbon tetrachloride, chloroform, or the like heavier-than-water liquid, the choice being made in accordance with the physical and chemical characteristics of the working liquid. Mercury also may be used satisfactorily, but is not so suitable if the U-tube 46 is too tall, because of the pendulum-like action which can occur if the mercury rises high in the legs of the U as into the tube 47. Suitably controlled, however, mercury may be a very acceptable intermediate or separating liquid, notwithstanding the inertia resulting from its very high specific gravity.

Figure 8:
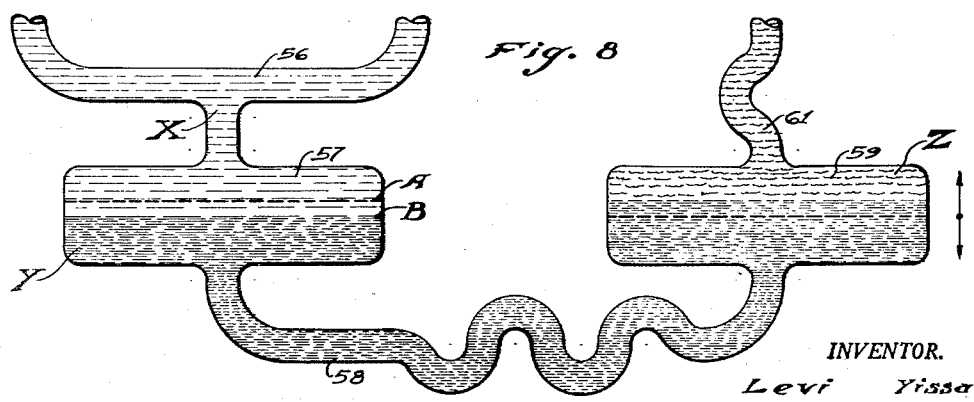
FIG. 8 shows a modification of the engine of FIG. 7 which may be employed to secure certain advantages.

One of the normal characteristics of a fluid piston engine is that, using a given working liquid (liquid X in the drawings) in the heated part of the device, the pressure of the power stroke is strictly a function of the temperature to which the fluid is heated. The suction stroke, however, depends upon the temperature in the condenser-receiver. If the engine is subjected to changing temperatures at both of its "ends," the output, pressure-wise, will vary. In the several embodiments of my invention shown in the drawings, various provisions are utilized to avoid fluctuations of output pressures. While adjustable spring loaded pistons and diaphragms may be interposed in the pressure delivery line, such compensating devices introduce mechanical friction, which also is undesirable in an engine of the general character described. Following the principles of my invention, however, I may accomplish the same general result by using the static pressure of a heavy liquid Y in the manner shown in FIG. 8. In this embodiment the bottom of a U-tube 56 (which may be identical with tube 44 in FIG. 7 and connected to a generator and condenser as in such FIG. 7) is connected by a tubulation to a fixed position enlarged area vessel 57. A flexible U-tube 58 has one leg connected to the bottom of the fixed position vessel 57 and the other leg connected to a similar vessel 59 suitably supported to be adjustable vertically. A flexible tube 61 connects to a tube (not shown) similar to tube 47 in FIG. 7 carrying a pumped liquid. In the drawing the three liquids used are identified as in other drawings by letters X, Y and Z. During operation, the level of liquids in the vessels 57 and 59 will vary between the full line positions and dotted line positions shown in the drawings. The first notable advantage of course is that the volume displacement may be great without appreciable linear movement of the intermediate liquid Y. There is still another advantage, however, in the control of pressures. For example, if the source of heat were solar, if both the heating and cooling temperatures should rise as would normally be the case, and delivery and suction pressures rise, moving vessel 59 up will bring them up to their normal values.

In the FIG. 9 fluid piston engine, the parts are arranged in substantially the same manner as in FIG. 7 except provision is made for utilization of a relatively light weight intermediate liquid Y such, for example, as a light paraffin oil, depending of course on the working liquid and pumped liquid used. For convenience and to shorten the description, the parts in FIG. 9 corresponding to like parts in FIG. 7 bear the same reference characters preceded, however, by the numeral 1. To lead to the inverted U-tube 146, however, an additional U-tube 150 attaches below tube 144 and leads to one leg of inverted U-tube 146.

Because of the lightness and preferred high vapor pressure of the working liquid X in FIG. 9 and the still greater lightness of the intermediate liquid Y, there is a tendency for vapor to accumulate at the top of the inverted U-tube 146. I therefore provide a bleeder hole at the top of such tube closable by a float valve 162 (see FIG. 10) and leading to a small tube 163 which in turn connects to the condenser 143, which, of course, also acts as a receiver and reservoir for the working liquid. Any vapor accumulating in tube 146 will therefore escape to condenser 143 until it is so reduced in volume that float valve 162 will rise and close off the opening leading to the bleeder tube 163.

Figure 11:
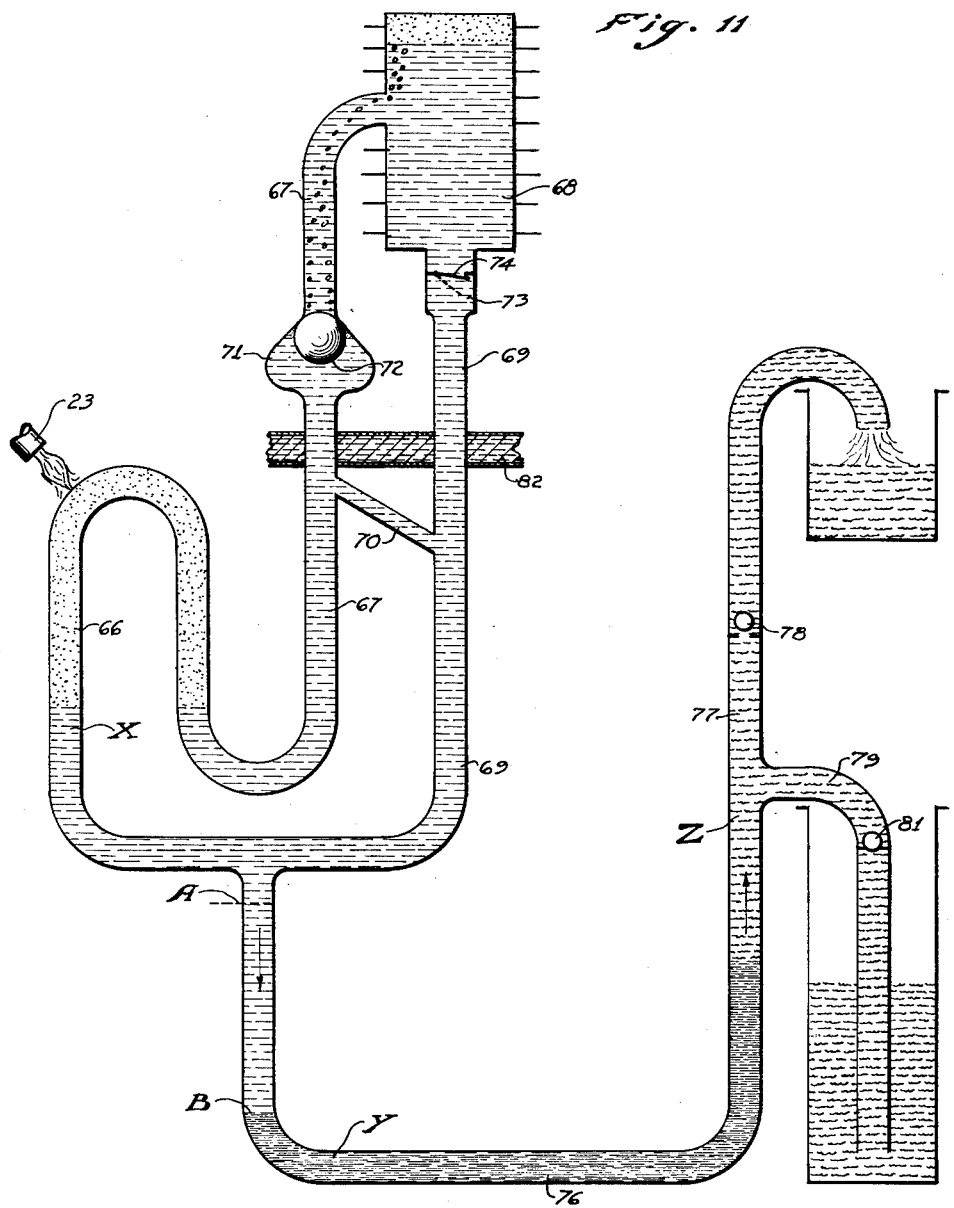
FIG. 11 shows an embodiment in which substantially all of the vapor pressure generated in the working liquid is effective against the pumped liquid.

The embodiment of my invention shown in FIG. 11 is similar to that shown in FIG. 7, but includes the feature of avoiding compression of vapor in the condenser to that all the energy generated by vaporization of a working liquid is effective to move the liquid piston and do useful work. In this form of the invention the generator 66 comprises an inverted U-tube, one leg of which is connected through a tube 67 at an intermediate point to a condenser 68, and the other leg of which is connected by a tube 69 to the bottom of condenser 68. An enlarged portion of tube 67 comprises a float chamber 71 containing a float valve 72. A slightly enlarged tubulation 73 immediately below the condenser 68 houses a check valve 74. A U-tube 76 connects with one leg through tube 69 to the bottom of one leg of the generator 66 as well as to the bottom of condenser 68. The opposite leg of the U-tube 76 also connects to the bottom of an upright tube 77 having a check valve 78. Below check valve 78 there is a side tube 79 having a check valve 81. Suitable insulation 82 may be disposed between the generator 66 and condenser 68. A small cross connection 70 is provided, suitably between tubes 67 and 69, to equalize pressure in both legs of the generator. This connection should slope downwardly toward tube 69 to prevent vapor from passing through it.

In operating a vapor actuated prime mover having the features of the FIG. 11 embodiment the generator, condenser, and connecting tubulation are filled with a suitable liquid such as discussed above. The intermediate U-tube 76 is filled with a liquid selected to transmit power from the generator to the pump system comprising tubes 77 and 79. When the device is disposed specifically as in FIG. 11, the liquid in the U-tube 76 is preferably heavier than either the liquid in the vapor generator system or pump system. Such liquid also should be chemically substantially immiscible with and inert to the two connecting liquids under the conditions of operation. When ready to start and at the end of each suction stroke, the interface between liquids X and Y will be at the point A, and tubes 77 and 79 are filled with the pumped liquid. During the pressure stroke there is no movement into the condenser 68 through the tube 69 because of the action of the closed valve; but substantially coincidentally with the beginning of the suction stroke, the valves open and permit replacement of vapor by liquid in a manner described more particularly hereinbelow.

Figure 12:
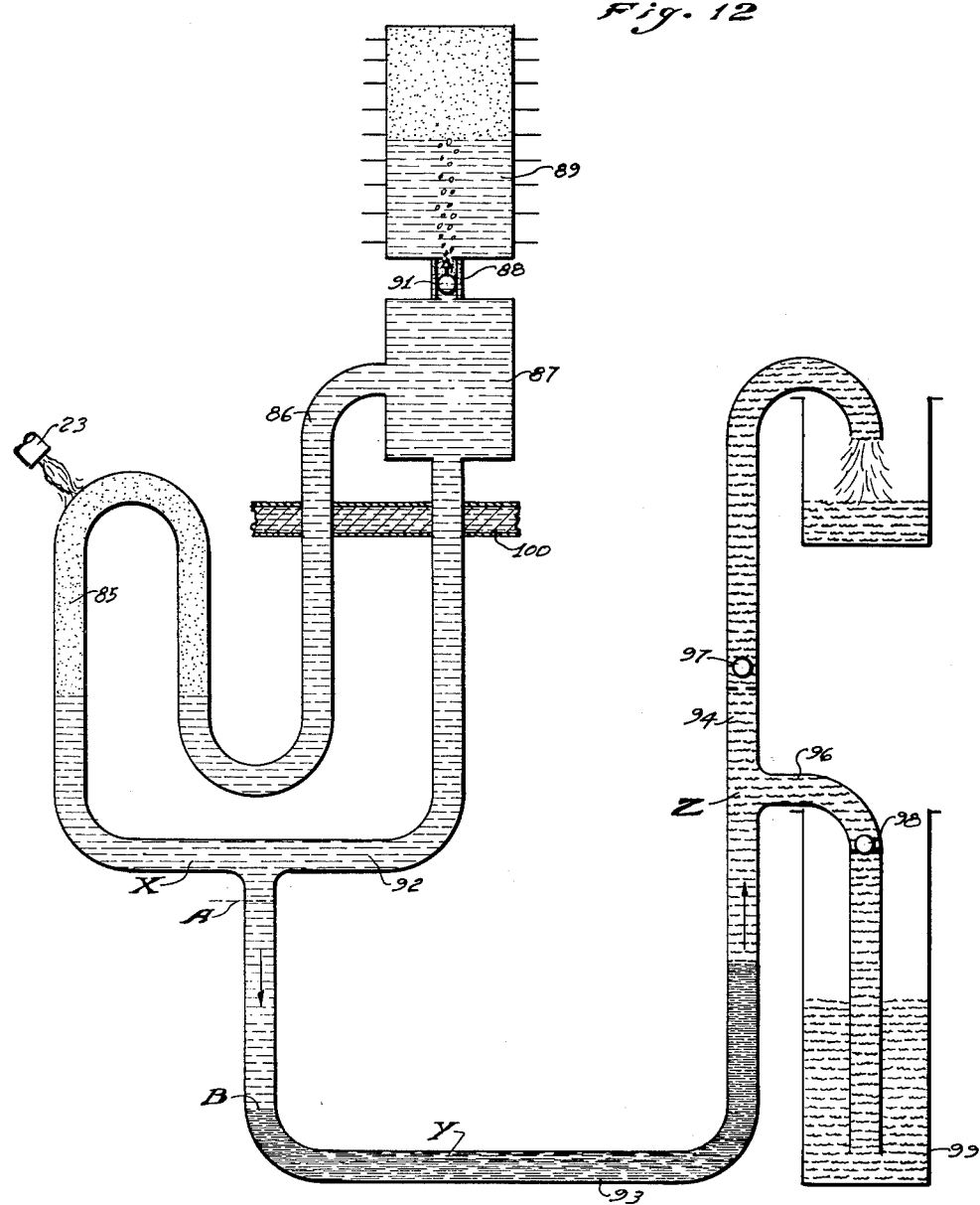
FIG. 12 is a modification similar to the embodiment of FIG. 11 but in which the condenser is still further isolated from the remaining portion of the system.

The FIG. 12 embodiment is generally similar to that just described execpt that the condenser and collector portions are separate and only a single float valve is required to accomplish substantially the same functions performed by the two valves in the prior embodiment. The inverted U-generator 85 has one leg secured to a riser tube 86 leading to the side of a liquid collector 87 connected by a narrow passageway 88 to a condenser 89 placed above the liquid collector. A float valve 91 is adapted to close the opening between collector 87 and condenser 89 when the former is filled with liquid. A U-tube 92 has one leg connected to the remaining leg of the inverted U-tube vapor generator and the opposite leg connected to the bottom of the collector as in previous embodiments. A second U-tube 93 has one leg connected at a mid-point to tube 92 and the opposite leg connected to a vertical tube 94 having a side tube 96. A conventional arrangement of check valves 97 and 98 to control suction of liquid from tank 99 and delivery to a suitable reservoir may be used. Heat insulation 100 may be used as in prior embodiments.

Figure 13:
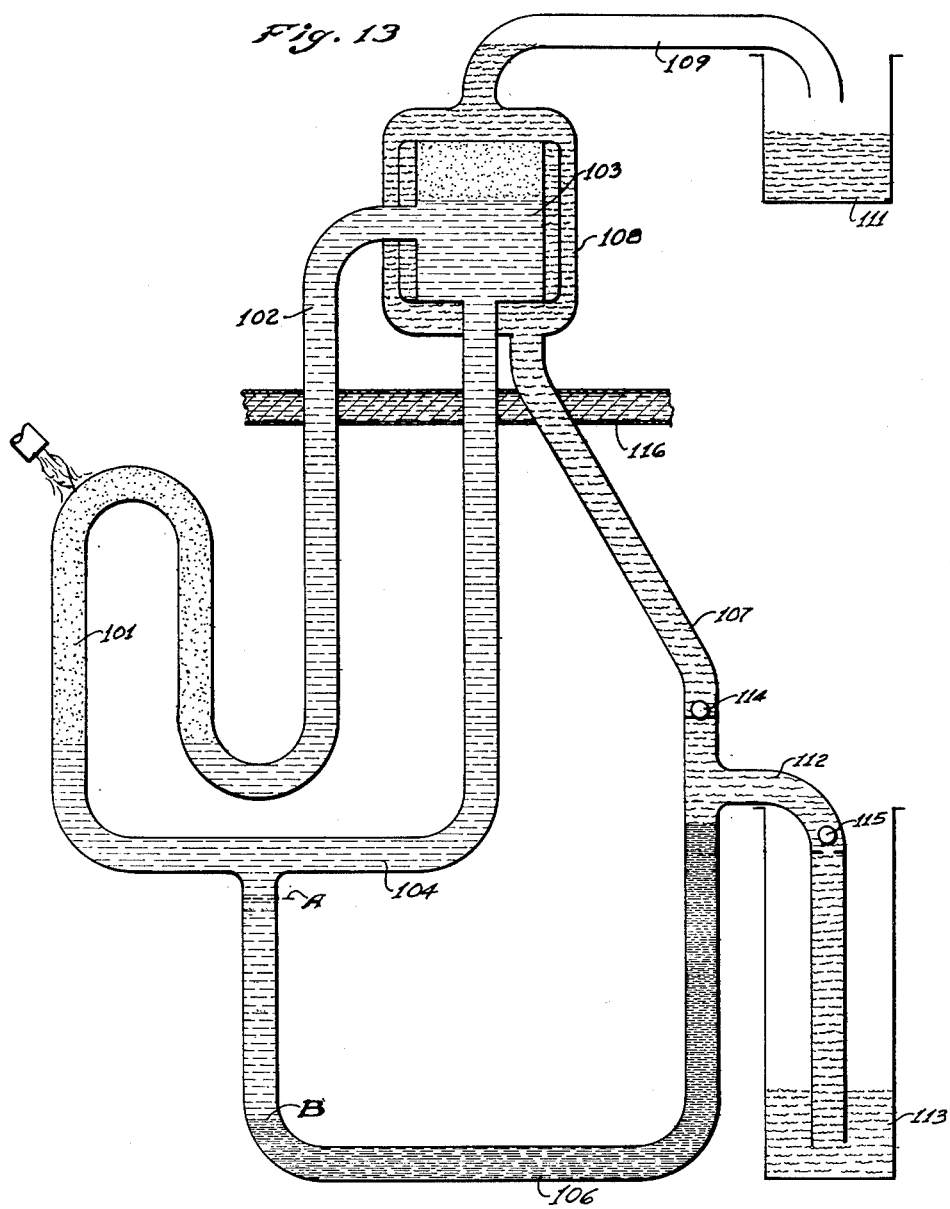
FIG. 13 shows a form of the invention in which the condenser is cooled by the pumped liquid.

In FIG. 3 I showed features which permitted heating the vapor generator by a second liquid, which optionally and under suitable conditions could be the liquid being pumped. The pumped liquid may also be employed to cool the condenser, as indicated in FIG. 13, through a suitable heat exchange structure. As shown in this figure, the inverted U-generator 101 is connected by tube 102 to a mid-point of a suitably finned condenser 103 and also by tube 104 to the bottom of such condenser. A U-tube 106 is connected to a mid-point of tube 104, and an upright 107 leading to a packet 108 around condenser 103 thence through outlet pipe 109 to a reservoir 111. A side tube 112 leads to a reservoir 113. Check valves 114 and 115 in tubes 107 and 112, respectively, function automatically to valve off these tubes during the suction and pressure strokes of the fluid piston engine. Insulation 116 may be appropriately used if desired.

In the embodiments of the invention shown in FIGS. 7 through 13, the basic action of the engine during the pressure and suction strokes is the same, even though each of the several embodiments has its own peculiar functions and advantages. All embodiments have the advantage of providing for a closed cycle operation of the engine, and either two or three liquids may be used depending on circumstances peculiar to a given location and the objective sought to be obtained. Many of the features disclosed may be combined. I wish to note also that the objective of the engine is to do useful work. The drawings indicate the work to be accomplished by a pumping operation. This is illustrative, and those skilled in the art will understood that there are many other types of work operations which may be performed.

While the general manner in which fluid piston engines operate is the same in that all of them go through their cycles of alternate vaporization pressure stroke and vapor condensation suction stroke as heat is applied continuously to the generator, in my opinion there are some advantages in the use of an inverted U-generator and U-shaped vapor tube connected to the so-called hot leg thereof. The action of alternate vaporization and condensation, even through heat application, is also more readily observed and explained when the type of structure described is employed.

Looking now again at FIGS. 7 through 13, when the liquids are as shown in FIG. 7 and the vaporization portion of the cycle has just been started, the several columns of liquid move in the direction indicated by the arrows. At this same time valve 51 is closed and valve 49 opened. Vapor continues to form and liquids are displaced by the increasing volume of generated vapor until approximately the condition of FIG. 11 is reached or the full line position of FIG. 8. Even though the FIG. 9 embodiment makes provision for a relatively light intermediate liquid Y, the operation of the portion of the engine containing the working liquid is unchanged between the two figures. In this connection, FIGS. 11 and 12 may also be noted, in which the fluid piston engine is nearing the end of its pressure stroke, and also FIG. 13 in which the vapor has reached its absolute lower limit and no movement in any direction is taking place. This is more or less a theoretical position because during actual observation this theoretical static position cannot be detected.

When vapor begins to reach the bottom of the U defined by the generator and tube 42 (FIG. 7) or 142 as in FIG. 9, there is a sudden movement of vapor upwardly to condenser 43 of substantially all the vapor in the generator. The light vapor rises in a series of bubbles through liquid still remaining in the tube, as indicated by the shading in FIG. 9. Simultaneously cold liquid is drawn up through the generator from U-tube 44 or 144 (FIGS. 7 and 9) including the leg leading to the condenser and the bottom of such condenser, as well as from U-tube 46 or 146. Coincidentally the vapor drawn to the condenser is converted to liquid and the initial position of the liquids at the start of the pressure stroke is restored. The points A and B in FIGS. 7 and 9 indicating the interface between the working liquid and intermediate liquid should be noted. These represent the extremes of movement in the ordinary cycle. In actual operation the pressure stroke takes a measurable time, but the suction stroke normally occurs very rapidly.

While the basic functioning of the several embodiments disclosed is the same, there are variations caused by incorporation of the several separate features. Thus in FIG. 11 the two valves isolate the condenser during the pressure stroke so that none of the power thus generated will be wasted in compressing the vapor at the top of the condenser, which vapor under most practical conditions cannot be entirely eliminated. When vapor enters the leg comprising the bottom of tube 67, however, the ball 72, being upsupported by liquid because of accumulated vapor, drops to let vapor rise into the condenser. Almost instantly liquid in the tube 69 (FIG. 11) begins to replace vapor rising from the generator in tube 67 so that valve 73 is permitted to open and replacement or feed liquid may flow from the bottom of the condenser. Float valve 72 closes as soon as there is liquid on which it may float, and check valve 74 closes as soon as pressure is again established in tube 69. The embodiment of FIG. 12 functions almost identically except that a single float valve is required because of separation of the condenser and receiver. When valve 91 is open, vapor bubbles up and liquid flows down.

An important feature of my invention, as previously indicated, is the isolation of the working liquid so that it functions in a closed cycle and so that substantially all the working liquid vaporized is effective to do useful work. The working liquid may be confined by a single liquid which the working liquid in turn moves in a work effort, or the liquid pumped may be separated by an intermediate liquid compatible with the liquids it separates, as shown in some of the figures. Actually, any of the embodiments of my invention shown may use either two or three liquids. The advantage of the use of the intermediate liquid is that, regardless of the liquid on which work is to be performed, the working liquid may be selected to provide the most efficient operation without regard to whether it is compatible with the worked liquid. Chemistry will almost always provide a suitable intermediate liquid which is compatible with the two liquids it separates.

While the fluid piston engine of my invention may be considered as comprising a unitary device with no moving power-generating, power-transmititng or power-receiving parts, I have in fact in all cases provided separate power-generating, power-transmitting, and power-application portions. These three distinct portions of the engine are, in general, the portions containing, respectively, the working, transmitting, and pumped liquids in the several embodiments, even though in the operating cycle there may be a partial displacement of one liquid by another. Thus, for example, in the FIG. 9 embodiment the inverted U-tube 146 essentially comprises the transmitting portion of the engine, but the working liquid may displace some of the transmitting liquid in its rising leg to which the connecting tube 150 attaches.

I wish also to point out that, unlike conventional engines of the prior art such as an internal combustion engine in which the gasoline or other fuel is definitely not a part of the structure, the working and transmitting liquids in the engine of my invention must be considered as part of the operating combination. It is by isolating a separate working liquid and choosing it for specific characteristics that substantially all the generated power is transmitted and substantially none of it is lost by loss of vapor as occurs when the vapor is not isolated.

While I have disclosed several embodiments of my invention and described in considerable detail the manner in which my invention is practiced, the scope of the invention is defined by the claim.

In a fluid piston engine, an inverted U-tube comprising a generator adapted to have heat continuously applied thereto, a condenser placed above said generator, a tube defining a U connecting one leg of said inverted U-tube generator to a bottom portion of said condenser, a second tube defining a U connecting the other leg of said generator to said condenser at a point above its said bottom, a second U-tube comprising a power transmitting portion, having one leg connected to a mid point of said first mentioned U-shaped tube, and a second leg connected to a tube forming part of a pump, and a pump comprising said tube to which said second leg is connected, and having a pump outlet, a side tube, and check valves in said side tube and pump outlet, said second mentioned U-tube being filled with a liquid different from the liquid in the generator, and forming a power transmitting portion for operation of said pump.

References Cited in the file of this patent
UNITED STATES PATENTS

| | | |
|---|---|---|
| 127,592 | Gates | June 4, 1872 |
| 1,308,515 | Wallace et al. | July 1, 1919 |
| 2,015,240 | Scott-Snell et al. | Sept. 24, 1935 |
| 2,241,620 | Shoeld | May 13, 1941 |
| 2,755,792 | Van Hock | July 24, 1956 |
| 2,757,618 | Kleen | Aug. 7, 1956 |
| 2,954,741 | Kleen | Oct. 4, 1960 |

FOREIGN PATENTS

| | | |
|---|---|---|
| 794,781 | Great Britain | May 7, 1958 |